United States Patent
Nakai et al.

(10) Patent No.: US 7,655,355 B2
(45) Date of Patent: Feb. 2, 2010

(54) POSITIVE ELECTRODE BINDER FOR ALKALINE STORAGE BATTERY

(75) Inventors: Haruya Nakai, Yokohama (JP); Toru Inagaki, Kamakura (JP); Yusuke Ozaki, Toyonaka (JP); Masayuki Saito, Ichihara (JP)

(73) Assignees: Panasonic Corporation, Osaka (JP); Asahi Glass Company, Limited, Tokyo (JP)

( * ) Notice: Subject to any disclaimer, the term of this patent is extended or adjusted under 35 U.S.C. 154(b) by 109 days.

(21) Appl. No.: 10/177,854

(22) Filed: Jun. 20, 2002

(65) Prior Publication Data

US 2003/0017394 A1 Jan. 23, 2003

(30) Foreign Application Priority Data

Jul. 4, 2001 (JP) .............................. 2001-203952

(51) Int. Cl.
  *H01M 4/62* (2006.01)
(52) U.S. Cl. .................. 429/217; 429/232; 29/623.1
(58) Field of Classification Search ............... 429/217, 429/232; 29/623.1
  See application file for complete search history.

(56) References Cited

U.S. PATENT DOCUMENTS

| | | | | |
|---|---|---|---|---|
| 5,609,975 A | * | 3/1997 | Hasegawa et al. ........... 429/217 |
| 5,714,282 A | * | 2/1998 | Tagawa ........................ 429/217 |
| 5,865,874 A | * | 2/1999 | Trainer ......................... 75/362 |
| 6,019,802 A | * | 2/2000 | Ishizuka et al. ............. 29/623.5 |
| 6,096,101 A | * | 8/2000 | Liu et al. ..................... 29/623.1 |
| 6,130,006 A | * | 10/2000 | Kohno et al. ................. 429/223 |
| 6,265,107 B1 | * | 7/2001 | Shimizu et al. .............. 429/217 |
| 6,475,663 B1 | * | 11/2002 | Mohwald et al. ............. 429/129 |
| 2003/0170540 A1 | * | 9/2003 | Ohzuku et al. ............ 429/231.1 |

FOREIGN PATENT DOCUMENTS

| | | | |
|---|---|---|---|
| JP | 07147156 A | * | 6/1995 |
| JP | 08130016 A | * | 5/1996 |
| JP | 09-045331 | | 2/1997 |
| JP | 11-003703 | | 1/1999 |
| JP | 11-025962 | | 1/1999 |
| JP | 11343317 A | * | 12/1999 |
| JP | 2000-353517 A | * | 12/2000 |

OTHER PUBLICATIONS

Linden. Handbook of Batteries, $2^{nd}$ ed., pp. 32.1 and 32.7, 1995.*
Linden. Handbook of Batteries, $2^{nd}$ edition. p. 33.2, 1995.*
Satokawa, "Flurocarbon Rubber Handbook", 6 pages (1990).

* cited by examiner

*Primary Examiner*—Tracy Dove
(74) *Attorney, Agent, or Firm*—Panitch Schwarze Belisario & Nadel LLP

(57) ABSTRACT

A positive electrode for an alkaline storage battery is disclosed, comprising a conductive base material and an active material layer attached to the base material, the active material layer comprising an active material and a binder, the binder comprising an elastic copolymer comprising one or more tetrafluoroethylene units and one or more propylene units.

4 Claims, No Drawings

POSITIVE ELECTRODE BINDER FOR ALKALINE STORAGE BATTERY

BACKGROUND OF THE INVENTION

Alkaline storage batteries are repeatedly rechargeable and have been used for power sources for a number of portable appliances. In particular, nickel-metal hydride storage batteries have been in broad use as having a high energy density and being environmentally friendly.

Positive electrodes for an alkaline storage battery comprise a conductive base material, an active material and a binder.

For the conductive base material used has been a foamed metal sheet, a punched metal sheet, an expanded metal sheet or the like.

For the active material, for example, a powder comprising nickel hydroxide, a powder comprising nickel hydroxide with the surface thereof coated with cobalt hydroxide, or a powder comprising nickel hydroxide with the surface thereof coated with cobalt oxyhydroxide has been generally in use for the alkaline storage battery.

For the binder used has been a fluorine resin such as polytetrafluoroethylene (hereinafter referred to as PTFE) as proposed in Japanese Laid-Open Patent Publication No. Hei 11-25962.

The binder is used for preventing the active material from falling off or separating from the base material and for binding active material particles to each other.

There are problems lying in the above-mentioned binder comprising a fluorine resin as follows:

(1) There is a case that, in the process of applying a paste comprising the active material and a fluorine resin as the binder to a conductive base material, the fluorine resin in the paste becomes fibrous depending on shear strength or temperature conditions. For example, when PTFE becomes fibrous, the viscosity of the paste increases and the flowability decreases, causing instability of the rheological property thereof. There is also a case that, in rolling process to extend the conductive base material applied with the paste, the base material is cut off by the lump of the fiber.

(2) Since the conventional binder comprising a fluorine resin is weakly bound to a metal constituting the conductive base material, the active material layer, which is obtained by applying the paste to the base material followed by drying, has a high tendency to fall off the base material. For this reason, a battery capacity decreases during discharging at a large current.

(3) Since the conventional binder comprising a fluorine resin has insufficient flexibility, the active material layer tends to have a crack therein when the electrode plate using the binder is wound up. As the cracking leads to the fall of the active material layer off the base material, there is no obtaining a sufficient battery capacity. A charge and discharge reaction also leads to the fall of the active material layer off the base material and, therefore, the repeated charge and discharge of the battery causes a decrease in the battery capacity.

BRIEF SUMMARY OF THE INVENTION

The present invention relates to a positive electrode for an alkaline storage battery comprising: a conductive base material (or a conductive support material) and an active material layer attached (or applied) to the conductive base material, wherein the active material layer comprises an active material and a binder, the binder comprises an elastic copolymer, and the elastic copolymer comprises one or more tetrafluoroethylene units and one or more propylene units.

It is preferable that the elastic copolymer comprises the tetrafluoroethylene unit and the propylene unit in a mole ratio of 3:7 to 7:3.

The elastic copolymer can further comprise one or more olefin units other than a tetrafluoroethylene unit and propylene unit.

As for at least one of the olefin units, a fluorine atom-contained olefin unit can be used.

It is preferable that the elastic copolymer has a content of the fluorine atom-contained olefin unit of 5 mole % or less.

It is preferable that the glass transition temperature (Tg) of the elastic copolymer is 20° C. or lower. By the use of the elastic copolymer the glass transition temperature of which is 20° C. or lower, a positive electrode plate having sufficient flexibility can be obtained.

It is preferable that the fluorine atom-contained olefin unit is a vinylidene fluoride unit.

It is preferable that the binder is able to absorb an alkaline aqueous solution of pH 13 or more in an amount of at most 3% by weight of the binder, when the binder is stored in the solution at 80° C.

It is preferable that the binder is contained in the positive electrode in an amount from not less than 0.1 parts by weight to not more than 10 parts by weight per 100 parts by weight of the active material.

It is preferable that the binder is particulate and the mean particle diameter thereof is 0.3 μm or smaller.

A foamed metal sheet, a punched metal sheet or an expanded metal sheet can be used for the conductive base material.

The present invention also relates to a method for producing a positive electrode for an alkaline storage battery comprising the steps of: preparing a paste, by mixing an active material with an emulsion comprising a binder dispersed in an aqueous medium, wherein the binder comprises an elastic copolymer comprising one or more tetrafluoroethylene units and one or more propylene units, and applying the paste to a conductive base material. It is preferable that the emulsion has a content of the binder from not less than 0.1% by weight to not more than 60% by weight.

While the novel features of the invention are set forth particularly in the appended claims, the invention, both as to organization and content, will be better understood and appreciated, along with other objects and features thereof, from the following detailed description.

DETAILED DESCRIPTION OF THE INVENTION

Embodiment 1

In Embodiment 1, a configuration of a positive electrode in accordance with the present invention will be described:

A positive electrode in accordance with the present invention comprises a conductive base material and an active material layer. The active material layer comprises an active material and a binder.

As for the conductive base material, for example, metal foil with burrs formed on the surface thereof, electrolytic nickel foil, electroless nickel foil, rolled nickel foil, iron foil with the surface thereof nickel-plated or the like can be used. Nickel foam sheet also can be used as the conductive base material. The metal foils are generally from 20 to 100 μm thick.

Next, the binder will be described in detail:

In the present invention, an elastic copolymer comprising one or more tetrafluoroethylene units and one or more propylene units is used as the binder for the positive electrode. It is preferable that the elastic copolymer comprises the tetrafluoroethylene unit and the propylene unit in a mole ratio of 3:7 to 7:3.

The elastic copolymer can further comprise one or more third olefin units other than a tetrafluoroethylene unit and propylene unit. The third olefin unit may be a fluorine atom-contained olefin unit or a normal hydrocarbon type olefin unit containing no fluorine atom. From the aspect of resistance to alkali, however, the content of the fluorine atom-contained olefin unit in the elastic copolymer is preferably 15 mole % or less, and more preferably 5 mole % or less. It is also preferable that the elastic copolymer has a content of 50% mole or less of the normal hydrocarbon type olefin unit containing no fluorine atom, as the third olefin unit.

As for the fluorine atom-contained olefin as the third olefin unit, hexafluoropropylene, vinylidene fluoride, (perfluorobutyl)ethylene, trifluorochloroethylene or the like can be used. Fluorine atom-contained acrylate or the like can also be used. The above-mentioned fluorine atom-contained olefins may be used singly or in combination of two or more of them.

As for the normal hydrocarbon type olefin as the third olefin unit, α-olefin such as ethylene or butene, acrylate containing no fluorine atom or the like can be used.

The elastic copolymer can be synthesized by the conventionally-known polymerization method such as mass polymerization, suspension polymerization, emulsion polymerization or solution polymerization. With these methods employed, the range of molecular weight of the elastic copolymer can be controlled arbitrarily.

The elastic copolymer can be used in a latex or emulsion state, or in a dispersed state in water or a dispersing medium after produced by means of the suspension polymerization, emulsion polymerization, solution polymerization or the like.

The elastic copolymer can also be used in a refined solid state. In this case, it is preferable that the solid elastic copolymer is dissolved in a solvent or dispersed in a dispersing medium. There is no particular limitation on the kind and amount of the solvent or dispersing medium.

The solvent or dispersing medium is selected as appropriate corresponding to the usage of the elastic copolymer.

As for the solvent or dispersing medium, ester such as ethyl acetate or butyl acetate, ketone such as acetone, methyl ethyl ketone or methyl isobutyl ketone, alcohol such as methanol or ethanol, hydrocarbon such as hexane, octane, toluene, xylene or naphtha, water or the like is preferably used. They may be used singly or in combination of two or more of them.

As for the elastic copolymer to serve as the binder, a tetrafluoroethylene-propylene type copolymer such as a tetrafluoroethylene-propylene copolymer or tetrafluoroethylene-propylene-vinylidene fluoride copolymer is preferable. The tetrafluoroethylene-propylene type copolymer has favorable resistance to alkali. They may be used singly or in combination of two or more of them.

While the molecular weight of the elastic copolymer is arbitrary, a copolymer having a molecular weight from not less than 2,000 to not more than 1,000,000 is preferable in terms of handling in the production process of the copolymer. The molecular weight of the elastic copolymer is more preferably from not less than 50,000 to not more than 300,000.

In the present invention, an elastic copolymer having a structure expressed by the formula: $-(CF_2-CF_2)_m-(CHCH_3-CH_2)_n-$ (hereinafter referred to as a copolymer A) or having a structure expressed by the formula: $-(CF_2-CF_2)_l-(CHCH_3-CH_2)_j-(CH_2-CF_2)_k-$ (hereinafter referred to as a copolymer B) is, in particular, used preferably.

Herein, m:n and l:j are preferably 3:7 to 7:3, respectively, and (l+j):k is preferably 1:0 to 0.95:0.05.

The copolymer A contains no vinylidene fluoride unit and the copolymer B contains only a limited amount of vinylidene fluoride unit. Although the vinylidene fluoride unit has a weak resistance to alkali, with the content thereof small, the elastic copolymer structure is hardly decomposed. Therefore, deterioration of the battery performance is prevented.

The binder has a specific gravity from not less than 1.40 to not more than 1.70 in general, preferably about 1.50 to 1.60.

The amount of the binder contained in the positive electrode is preferably from not less than 0.1 parts by weight to not more than 10 parts by weight per 100 parts by weight of the active material. It is to be noted that the optimum amount of the binder differs depending on the kind of the conductive base material. In a case where the conductive base material has a structure suitable for keeping the active material, like a foamed metal sheet, it is possible to obtain a positive electrode excellent in flexibility and binding property even when the amount of the binder is from not less than 0.1 parts by weight to not more than 1.0 parts by weight per 100 parts by weight of the active material. When the conductive base material is a punched metal sheet, an expanded metal sheet or a three dimensionally processed expanded metal sheet, the optimum amount of the binder contained in the positive electrode is from not less than 2.0 parts by weight to not more than 6.0 parts by weight per 100 parts by weight of the active material.

As for the active material, a powder which is generally in use for the alkaline storage battery, such as a powder comprising nickel hydroxide, a powder comprising nickel hydroxide with the surface thereof coated with cobalt hydroxide, or a powder comprising nickel hydroxide with the surface thereof coated with cobalt oxyhydroxide, can be used.

With the use of the above-mentioned positive electrode, an alkaline storage battery excellent in the charge and discharge cycle characteristic and having a large discharge capacity during discharging at a large current can be obtained.

Embodiment 2

In EMBODIMENT 2, a method for producing a positive electrode comprising a nickel compound, that is, nickel positive electrode, will be described:

A positive electrode for an alkaline storage battery in accordance with the present invention can be produced by a method comprising: a first step of mixing an active material, a conductive agent and a binder to give a paste; and a second step of applying the given paste to a conductive base material followed by drying and rolling.

(i) First Step:

100 parts by weight of an active material powder comprising nickel hydroxide is mixed with a binder in an amount from not less than 0.1 parts by weight to not more than 10.0 parts by weight, to prepare a paste.

It is preferable that the binder is used in a state of an emulsion comprising the binder and an aqueous dispersing medium. The use of the emulsion facilitates preparation of the paste containing the active material. In this case, the content of the binder in the emulsion is preferably from not less than 0.1% by weight to not more than 60% by weight. A surfactant such as a sodium laurate or other materials necessary for the polymerization to produce the binder may be contained in the dispersing medium of the emulsion.

(ii) Second Step:

Next, the above-mentioned paste is applied to the conductive base material, which is then dried, preferably at 80 to 120° C. for 1 to 20 minutes, and rolled, to form an electrode plate comprising an active material layer. Subsequently, the electrode plate is cut off as necessary so as to obtain a required positive electrode. Leads are connected to the positive electrode as needed.

Embodiment 3

In EMBODIMENT 3, an alkaline storage battery comprising a positive electrode in accordance with the present invention will be described.

An alkaline storage battery comprises: a battery case having an aperture; an electrode assembly comprising a positive electrode, a negative electrode and a separator, and accommodated in the battery case; an alkaline electrolyte; and a sealing member for sealing the aperture of the battery case. As for the positive electrode, that of EMBODIMENT 1 is used.

As for the battery case, negative electrode, separator and alkaline electrolyte, those in general use for the alkaline storage battery can be used as follows:

As for the negative electrode, a negative electrode containing a hydrogen storage alloy, a negative electrode containing cadmium or the like can be used.

As for the separator, a non-woven fabric made of polypropylene, the surface of which is preferably sulfonated, or the like can be used.

As for the alkaline electrolyte, an alkaline aqueous solution containing potassium hydroxide as a main solute and having a specific gravity of about 1.3 is preferably used.

In the following, the present invention will be described more concretely based on the examples.

Example 1

A nickel hydroxide solid solution powder was used as a positive electrode active material. The nickel hydroxide solid solution powder was produced using the following known method.

First, an aqueous solution containing nickel sulfate as a main solute and further containing respective predetermined amounts of cobalt sulfate and zinc sulfate was prepared. Into this aqueous solution thus prepared, a sodium hydroxide aqueous solution was dropped by degrees while adjusting the pH thereof with ammonia water, leading to precipitation of spherical nickel hydroxide solid solution. The obtained nickel hydroxide solid solution powder was washed with water and dried. The mean particle diameter of this powder was measured with a laser diffractometry type grain size analyzer to be 10 µm. The specific surface area of the powder was measured by a BET method to be 12 m$^2$/g.

As for a conductive agent for the positive electrode, a cobalt hydroxide fine powder was used. The cobalt hydroxide fine particles were produced using the following known method:

First, a cobalt sulfate aqueous solution of 1 mol/liter was added little by little to a sodium hydroxide aqueous solution, leading to precipitation of cobalt hydroxide fine particles (β-type). During the addition of the cobalt sulfate aqueous solution above, the sodium hydroxide aqueous solution was stirred at 35° C. while keeping the pH thereof at 12. The mean particle diameter of the obtained fine powder was measured using the SEM image thereof to be 0.2 µm. The specific surface area of the fine powder was measured by a BET method to be 25 m$^2$/g.

Next, by the use of the nickel hydroxide solid solution powder, the cobalt hydroxide fine particles, an aqueous solution containing 1% by weight of carboxymethyl cellulose (CMC) and an aqueous emulsion containing 30% by weight of a predetermined binder, a paste for the positive electrode was prepared.

As for the binder, an elastic copolymer containing one or more tetrafluoroethylene units and one or more propylene units in a mole ratio of 55:45 (Tg:−3° C.) was used. This elastic copolymer had a specific gravity of 1.55.

The paste for the positive electrode was produced in the following procedure:

First, 100 parts by weight of the nickel hydroxide solid solution powder and 10 parts by weight of the cobalt hydroxide fine particles were put into a kneading machine to be sufficiently mixed with a stirring vane. Subsequently, while continuing the mixing, 20 parts by weight of the CMC solution was dropped little by little into the kneading machine. Then, the aqueous emulsion of the binder was added to the kneading machine in an amount containing 3.0 parts by weight of the elastic copolymer, so as to obtain a paste for the positive electrode containing the active material powder and the binder in weight proportions of 100:3 and having a moisture content of 19.2% by weight.

The viscoelasticity of the paste for the positive electrode thus obtained was measured with a rheometer (produced by Nihon SiberHegner K. K.). The viscosity η of the paste for the positive electrode was 500 poises when a shearing speed γ with respect to the paste was 0.1 (1/sec), and 5 poises when the shearing speed γ with respect to the paste was 10 (1/sec).

In general, the paste for the positive electrode is quantitatively applied to the conductive base material with the use of a die coater or the like. At a nozzle of the die coater, the paste is applied with an excessive shearing speed.

However, the viscosity of the paste for the positive electrode becomes lower with an increase in the shearing speed, thereby presumably promoting highly smooth discharge of the paste out of the nozzle of the die coater.

On the other hand, the viscosity of the above paste becomes higher with a decrease in the shearing speed, thereby presumably preventing the drip of the paste off the base material during the drying process of the paste after the application thereof to the base material.

That is to say, the above-mentioned paste for the positive electrode has viscoelasticity highly suitable for the general process for applying or coating.

Next, the viscoelasticity of the paste for the positive electrode was measured at a shearing speed of 10 (1/sec) for 20 minutes in order to confirm the stability of rheology of the paste. As a result, no change in the viscosity was observed. It is considered from this result that the viscoelasticity of the paste for the positive electrode does not practically change even with a large shearing strength applied for a long time in the production process thereof. It can be said, therefore, that the above paste has excellent stability.

The above-mentioned paste for the positive electrode was applied to a conductive base material, made of nickel foil, having a thickness of 25 µm. The base material had been three dimensionally processed to have an apparent 350 µm thickness.

The base material applied with the paste was dried with heated air of 110° C. for 10 minutes and then extended with a roll press to be 400 µm thick. A positive electrode plate comprising the base material and the active material layer was thus formed. The obtained positive electrode plate was cut into a predetermined size to give a positive electrode A, to which leads were welded.

Comparative Example 1

Next, a conventional positive electrode was produced.

First, a nickel hydroxide solid solution powder and a cobalt hydroxide fine particles were produced in the same manner as in EXAMPLE 1. Then, 100 parts by weight of the nickel hydroxide solid solution powder and 10 parts by weight of the cobalt hydroxide fine particles were put into a kneading machine to be sufficiently mixed with a stirring vane. Subsequently, while continuing the mixing, 2.5 parts by weight of water and 20 parts by weight of the CMC solution were dropped little by little into the kneading machine. An aqueous emulsion containing 60% by weight of PTFE was added to the kneading machine in an amount containing 3.0 parts by weight of PTFE. A paste for the positive electrode of COMPARATIVE EXAMPLE was thus obtained.

The viscoelasticity of the paste for the conventional positive electrode thus obtained was measured with a rheometer (produced by Nihon SiberHegner K. K.). The viscosity of the paste for the conventional positive electrode was 500 poises when a shearing speed with respect to the paste was 0.1 (l/sec), and 7 poises when the shearing speed with respect to the paste was 10 (l/sec). Considering from only these measured values, it may be said that the paste for the conventional positive electrode of COMPARATIVE EXAMPLE has viscoelasticity suitable for the applying process. In practice, however, the paste did not have sufficient stability of rheology.

The viscoelasticity of the paste for the conventional positive electrode was measured at a shearing speed of 10 (l/sec) for 20 minutes in order to confirm the stability of rheology of the paste. As a result, the viscosity of the paste increased with the passage of time, to go over the measurement limitation of the rheometer in about 5 minutes. This is presumably because PTFE gradually became fibrous as high shearing strength was exerted thereon and the fiber caught and included the nickel hydroxide solid solution particles to form a lump. Ultimately, the viscosity of the paste rose significantly and the paste lost the flowability. It can be said, accordingly, that the rheology of the paste for the conventional positive electrode of COMPARATIVE EXAMPLE is apt to vary with the duration of time in the production process thereof and therefore is unstable.

The paste for the positive electrode of COMPARATIVE EXAMPLE was applied to a conductive base material, made of nickel foil, having a thickness of 20 μm. The base material had been three dimensionally processed to have an apparent thickness of 350 μm.

The base material applied with the paste was dried with heated air of 110° C. for 15 minutes and then extended by a roll press to be 400 μm thick. A positive electrode plate comprising the base material and the active material layer was thus formed. The obtained positive electrode plate was cut into a predetermined size to give a conventional positive electrode B, to which leads were welded.

Production and Evaluation of Batteries:

(i) Production of Batteries:

Using the positive electrodes A and B thus produced, AAA-sized nickel-metal hydride storage batteries having a nominal capacity of 900 mAh were produced, respectively. A negative electrode mainly containing a hydrogen storage alloy, a separator made of polypropylene with hydrophilicity imparted and an alkaline electrolyte of 8N containing potassium hydroxide as a main solute were used for the production.

Hereinafter, the battery using the positive electrode A is referred to as the alkaline storage battery A and the battery using the positive electrode B of COMPARATIVE EXAMPLE as the alkaline storage battery B.

(ii) Evaluation of Utilization Rates of Positive Electrode Active Materials:

First, the batteries A and B were subjected to a twice-repeated initial charge and discharge. The charge was conducted at a current of 10 hour rate (0.1 C, 1 C=900 mA) for 15 hours; the discharge was conducted at a current of 0.2 C for 4 hours. The batteries were then aged at 45° C. for 3 days to activate the negative electrode alloy. Subsequently, both batteries were charged and discharged in some conditions to measure the utilization rates of active materials of the positive electrodes A and B. The results are shown in Table 1.

TABLE 1

| Positive electrode | Utilization rate of active material (%) | | |
|---|---|---|---|
| | 0.2 C | 1 C | 2 C |
| A | 100 | 93 | 85 |
| B | 98 | 90 | 80 |

For the calculation of each of utilization rate of the active material in Table 1, the discharge capacity was divided by a theoretical capacity of the positive electrode of each battery, which was then multiplied by 100 to be expressed as a percentage. The theoretical capacity of the positive electrode was obtained by multiplying the amount (g) of nickel hydroxide in the positive electrode active material by the electric capacity of nickel hydroxide 289 mAh/g: which is given with the assumption that one-electron reaction proceeds by the nickel hydroxide. The discharge capacity was measured by overcharging the batteries up to 120% at a current of 1 C and then discharging the batteries at a current of 0.2 C, 1 C and 2 C until the battery voltage reached 0.8 V.

It is found from Table 1 that the alkaline storage battery A produced using the positive electrode A of EXAMPLE has a higher utilization rate of the positive electrode active material than the alkaline storage battery B produced using the positive electrode B of COMPARATIVE EXAMPLE. This was presumably because an excellent flexibility was imparted to the positive electrode A, by using the elastic copolymer comprising one or more tetrafluoroethylene units and one or more propylene units for the binder of the positive electrode A, enabling prevention of the active material layer from being separated from the conductive base material even when the electrode assembly was produced by winding up the positive electrode A and the negative electrode via the separator. The same goes for binding strength between the active material particles. As a result, presumably, the current collection was enhanced and the utilization rate of the positive electrode A increased.

(iii) Evaluation of the Charge and Discharge Cycle Characteristic:

The batteries A and B were charged at a current of 1 C on a basis of the −ΔV (ΔV=0.01 V) control and then discharged at a current of 1 C until the battery voltage reached 0.8 V. This cycle was repeated. The discharge capacities at 100th, 200th and 300th cycle were measured. The results are shown in Table 2.

TABLE 2

| Positive electrode | Discharge capacity (mAh) | | |
| --- | --- | --- | --- |
|  | 100th cycle | 200th cycle | 300th cycle |
| A | 900 | 900 | 890 |
| B | 900 | 890 | 850 |

As shown in Table 2, the alkaline storage battery A in accordance with the present invention has inhibited a decrease in the capacity due to the repeated cycles than the alkaline storage battery B of COMPARATIVE EXAMPLE. This was presumably because, by using the elastic copolymer comprising one or more tetrafluoroethylene units and one or more propylene units for the binder, the binding property between the positive electrode active material particles as well as the binding property between the conductive base material and the active material particles improved, preventing the active material from falling off the base material. Another reason for the results of Table 2 was presumably that in the alkaline storage battery A in accordance with the present invention, the binder was hardly decomposed with the alkaline electrolyte.

Example 2

Positive electrodes C, D and E were produced respectively in the same manner as in EXAMPLE 1, except that the following binders were used in place of the binder of EXAMPLE 1. Then, by the use of the positive electrodes C, D and E, alkaline storage batteries C, D and E were produced in the same manner as in EXAMPLE 1.

For the positive electrode C, an elastic copolymer containing tetrafluoroethylene units, propylene units and vinylidene fluoride units in a mole ratio of 50:45:5 (Tg:−3° C.) was used.

For the positive electrode D, an elastic copolymer containing tetrafluoroethylene units, propylene units and vinylidene fluoride units in a mole ratio of 50:40:10 (Tg:−3° C.) was used.

For the positive electrode E, an elastic copolymer containing tetrafluoroethylene units, propylene units and vinylidene fluoride units in a mole ratio of 40:25:35 (Tg:−13° C.) was used.

The charge and discharge characteristics of the batteries C, D and E were evaluated in the same manner as in EXAMPLE 1. The results are shown in Table 3.

TABLE 3

| Positive electrode | Discharge capacity (mAh) | | |
| --- | --- | --- | --- |
|  | 100th cycle | 200th cycle | 300th cycle |
| A | 900 | 900 | 890 |
| C | 900 | 900 | 890 |
| D | 900 | 880 | 860 |
| E | 900 | 700 | 500 |

It is found from Table 3 that the preferable content of the vinylidene fluoride unit in the binder is 5% mole or less.

Example 3

Positive electrodes F, G, H, I and J were produced respectively in the same manner as in EXAMPLE 1, except that the amount of the binder in the positive electrode was changed. Then, by the use of the positive electrodes F, G, H, I and J, alkaline storage batteries F, G, H, I and J were produced in the same manner as in EXAMPLE 1.

In the positive electrode F, the same binder as that used in EXAMPLE 1 was used. The amount of the elastic copolymer as the binder contained in the positive electrode F was 0.1 parts by weight per 100 parts by weight of the nickel hydroxide solid solution powder.

In the positive electrode G, the same binder as that used in EXAMPLE 1 was used. The amount of the elastic copolymer as the binder contained in the positive electrode G was 1 part by weight per 100 parts by weight of the nickel hydroxide solid solution powder.

In the positive electrode H, the same binder as that used in EXAMPLE 1 was used. The amount of the elastic copolymer as the binder contained in the positive electrode H was 5 parts by weight per 100 parts by weight of the nickel hydroxide solid solution powder.

In the positive electrode I, the same binder as that used in EXAMPLE 1 was used. The amount of the elastic copolymer as the binder contained in the positive electrode I was 10 parts by weight per 100 parts by weight of the nickel hydroxide solid solution powder.

In the positive electrode plate J, the same binder as that used in EXAMPLE 1 was used. The amount of the elastic copolymer as the binder contained in the positive electrode J was 15 parts by weight per 100 parts by weight of the nickel hydroxide solid solution powder.

The charge and discharge characteristics of the batteries F, G, H, I and J were evaluated in the same manner as in EXAMPLE 1, except that the discharge capacity at 1st, 150th and 300th cycle were measured. The results are shown in Table 4.

TABLE 4

| Positive electrode | Discharge capacity (mAh) | | |
| --- | --- | --- | --- |
|  | 1st cycle | 150th cycle | 300th cycle |
| A | 900 | 900 | 890 |
| F | 880 | 850 | 750 |
| G | 890 | 880 | 870 |
| H | 890 | 890 | 885 |
| I | 880 | 880 | 880 |
| J | 830 | 830 | 830 |

It is found from Table 4 that the preferable amount of the binder to be contained in the positive electrode is from not less than 3 parts by weight to not more than 10 parts by weight per 100 parts by weight of the nickel hydroxide solid solution powder.

Example 4

Positive electrodes K, L, M, N and O were produced respectively in the same manner as in EXAMPLE 1, except that a foamed metal sheet (0.7 mm thick and 96% porosity) was used in place of the three dimensionally processed conductive base material and, further, the amount of the binder contained in the positive electrode was changed. Then, by the use of the positive electrodes K, L, M, N and O, alkaline storage batteries K, L, M, N and O were produced in the same manner as in EXAMPLE 1.

In the positive electrode K, the same binder as that used in EXAMPLE 1 was used. The amount of the elastic copolymer as the binder contained in the positive electrode K was 0.05 parts by weight per 100 parts by weight of the nickel hydroxide solid solution powder.

In the positive electrode plate L, the same binder as that used in EXAMPLE 1 was used. The amount of the elastic copolymer as the binder contained in the positive electrode L was 0.1 parts by weight per 100 parts by weight of the nickel hydroxide solid solution powder.

In the positive electrode plate M, the same binder as that used in EXAMPLE 1 was used. The amount of the elastic copolymer as the binder contained in the positive electrode M was 0.5 parts by weight per 100 parts by weight of the nickel hydroxide solid solution powder.

In the positive electrode plate N, the same binder as that used in EXAMPLE 1 was used. The amount of the elastic copolymer as the binder contained in the positive electrode N was 1 part by weight per 100 parts by weight of the nickel hydroxide solid solution powder.

In the positive electrode plate O, the same binder as that used in EXAMPLE 1 was used. The amount of the elastic copolymer as the binder contained in the positive electrode 0 was 3 parts by weight per 100 parts by weight of the nickel hydroxide solid solution powder.

The charge and discharge characteristics of the batteries K, L, M, N and O were evaluated in the same manner as in EXAMPLE 1, except that the discharge capacity at 1st, 150th and 300th cycle were measured. The results are shown in Table 5.

TABLE 5

| Positive electrode | Discharge capacity (mAh) | | |
|---|---|---|---|
| | 1st cycle | 150th cycle | 300th cycle |
| K | 900 | 870 | 800 |
| L | 900 | 890 | 880 |
| M | 900 | 900 | 900 |
| N | 900 | 900 | 900 |
| O | 880 | 880 | 880 |

It is found from Table 5 that, when a foamed metal sheet is used, the preferable amount of the binder to be contained in the positive electrode is from not less than 0.1 parts by weight to not more than 3 parts by weight per 100 parts by weight of the nickel hydroxide solid solution powder.

The use of the positive electrode in accordance with the present invention for the alkaline storage battery, therefore, enables obtainment of an alkaline storage battery having a satisfactory charge and discharge characteristic and a large discharge capacity during discharging at a large current.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for producing an alkaline storage battery comprising the steps of:
    producing a positive electrode by preparing a paste mixture of an active material with an emulsion comprising a binder dispersed in an aqueous medium, wherein the binder comprises an elastic copolymer comprising one or more tetrafluoroethylene units and one or more $CHCH_3CH_2$ units in a mole ratio of 3:7 to 7:3 and the binder is present in an amount of 1 to 10 parts by weight per 100 parts by weight of the active material, and wherein the active material comprises nickel hydroxide;
    applying the paste to a conductive base material; and
    assembling the positive electrode in the alkaline storage battery.

2. The method for producing an alkaline storage battery according to claim 1, wherein a content of the binder in the emulsion is from not less than 0.1% by weight to not more than 60% by weight.

3. The method for producing an alkaline storage battery according to claim 1, wherein said elastic copolymer further comprises one or more vinylidene fluoride units.

4. The method for producing an alkaline storage battery in accordance with claim 3, wherein the content of said vinylidene fluoride units is 5 mole % or less of said elastic copolymer.

* * * * *